United States Patent

Ng et al.

[11] Patent Number: 5,951,691
[45] Date of Patent: Sep. 14, 1999

[54] METHOD AND SYSTEM FOR DETECTION AND RECONSTRUCTION OF CORRUPTED DATA IN A DATA STORAGE SUBSYSTEM

[75] Inventors: Chan Yiu Ng; James C. Chen; Charles Richard Lanzi, all of San Jose, Calif.

[73] Assignee: International Business Machines Corporation, Armonk, N.Y.

[21] Appl. No.: 08/857,890

[22] Filed: May 16, 1997

[51] Int. Cl.$^6$ .................................................. G06F 11/00
[52] U.S. Cl. .............................................. 714/5; 714/770
[58] Field of Search ........................ 395/182.03, 182.04, 395/182.06, 182.11, 183.18, 183.19, 183.2, 185.01, 482.04, 578; 371/40.11, 40.2, 40.15; 714/5, 8, 15, 20, 21, 25, 37, 44, 770, 771, 819

[56] References Cited

U.S. PATENT DOCUMENTS

| | | | |
|---|---|---|---|
| 5,195,100 | 3/1993 | Katz et al. | 371/66 |
| 5,208,813 | 5/1993 | Stallmo | 371/10.1 |
| 5,233,618 | 8/1993 | Glider et al. | 371/68.1 |
| 5,235,601 | 8/1993 | Stallmo et al. | 371/40.1 |
| 5,301,297 | 4/1994 | Menon et al. | 395/482.04 |
| 5,303,244 | 4/1994 | Watson | 371/10.1 |
| 5,345,565 | 9/1994 | Jibbe et al. | 395/325 |
| 5,388,013 | 2/1995 | Nakamura | 360/48 |
| 5,390,187 | 2/1995 | Stallmo et al. | 371/10.1 |
| 5,390,327 | 2/1995 | Lubbers et al. | 395/575 |
| 5,412,661 | 5/1995 | Hao et al. | 371/10.1 |
| 5,455,834 | 10/1995 | Chang et al. | 371/40.1 |
| 5,459,853 | 10/1995 | Best et al. | 395/441 |
| 5,463,765 | 10/1995 | Kakuta et al. | 395/182.04 |
| 5,469,453 | 11/1995 | Glider et al. | 371/68.1 |
| 5,475,697 | 12/1995 | Katz et al. | 395/486 |
| 5,504,858 | 4/1996 | Ellis et al. | 395/182.04 |
| 5,506,979 | 4/1996 | Menon | 395/439 |
| 5,522,031 | 5/1996 | Ellis et al. | 395/182.04 |
| 5,528,755 | 6/1996 | Beardsley et al. | 395/185.01 |
| 5,581,690 | 12/1996 | Ellis et al. | 395/182.04 |
| 5,615,335 | 3/1997 | Onffroy et al. | 395/183.06 |
| 5,621,882 | 4/1997 | Kakuta | 395/482.04 |
| 5,640,506 | 6/1997 | Duffy | 395/182.04 |
| 5,778,167 | 7/1998 | Carrel et al. | 395/182.06 |

OTHER PUBLICATIONS

"Non–Volatile Cache Storage Allocation Algorithm," *IBM Technical Disclosure Bulletin*, vol. 38, No. 12, 39–41 (Dec. 1995).

"Dynamic Erase Record Gap Length Determination Using Block Read–While–Write Status," *IBM Technical Disclosure Bulletin*, vol. 38, No. 11, 145–148 (Nov. 1995).

"Priori Information hidden in Error Code Redundant Information," *IBM Technical Disclosure Bulletin*, vol. 38, No. 05, 455–456 (May 1995).

*Primary Examiner*—Robert W. Beausoliel, Jr.
*Assistant Examiner*—Nadeem Iqbal
*Attorney, Agent, or Firm*—Sawyer & Associates; Esther E. Klein

[57] ABSTRACT

The present invention provides a method and system for detecting corrupted data of a plurality of hard disk drives (HDDs) in a data storage subsystem. In this system a predetermined number of fixed blocks within each of the HDDs emulate a track of a first track format. The predetermined number of fixed blocks provide a logical track. The logical track of one of the plurality of HDDs is generated by the others of the plurality of HDDs. The plurality of logical tracks forming a plurality of track groups. In a first aspect the method and system comprises assigning each of the plurality of logical tracks an address translation (ADT) number, comparing each of the ADT numbers of the plurality of logical tracks to an expected value until a mismatch occurs in a logical track, and determining if other logical tracks in a same track group have accurate ADT numbers. The first aspect further includes reconstructing the logical track if the other tracks within the same track group have accurate ADT numbers. In a second aspect the method and system comprises determining each of the plurality of logical tracks is formatted in accordance with first track format, comparing each of the formats of the plurality of logical tracks to the expected format until a mismatch occurs in a logical track, and determining if other logical tracks in a same track group have accurate first track formats. The second aspect includes reconstructing the logical track if the other tracks within the same track group have accurate first formats.

50 Claims, 8 Drawing Sheets

HA & Count Format:

bytes 0-2 Emulation Control
position 3-14 Skip Control Information
18-19 Cell Number-Identifies Location of Record
on the CKD Track
20-22 PA (Physical Address) - Unique for each CKD Track
23 Flags
24-28 Record ID (CCHHR)
29 Key Length
30-31 Data Length
32-43 Count Field ECC

FIG. 4

METHOD AND SYSTEM FOR DETECTION AND RECONSTRUCTION OF CORRUPTED DATA IN A DATA STORAGE SUBSYSTEM

FIELD OF THE INVENTION

The present invention relates generally to a redundant array of inexpensive disks (RAID) and more particularly relates to the detection and reconstruction of data in a disk array system.

BACKGROUND OF THE INVENTION

In the recent high-technology computer systems, a strong demand has been made to considerably increase the performance of the storage device. As one of the possible solutions for increasing the performances, a disk array arranged by employing a large number of drives each having a relatively small storage capacity may be considered.

In the report, "A case for Redundant Arrays of Inexpensive Disks (RAID)" written by D. Patterson, G. Gibson and R. H. Kartz, the performances and reliabilities of the disk arrays (levels 3 and 5) have been described. In the disk array (level 3), data is subdivided and the subdivided data are processed in a parallel mode. In the disk array (level 5), data is distributed and the distributed data are independently handled.

First, a description will be made of the disk array at the level 3, in which the data is subdivided and the subdivided data are processed in the parallel mode. The disk array is arranged by employing a large number of drives each having a relatively small capacity. One piece of write data transferred from the CPU is subdivided into a plurality of subdivided data which will then be used to form parity data. These subdivided data are stored into a plurality of drives in a parallel mode. Conversely, when the data is read out, the subdivided data are read out from the respective drives in a parallel mode, and these subdivided data are combined which will then be transferred to the CPU. It should also be noted that a group of plural data and error correction data will be called a "parity group". In this specification, this terminology will also be employed in such a case that error correction data does not correspond to parity data. This parity data is used to recover data stored in one drive where a fault happens to occur, based upon data and parity data stored in the remaining drives, into which the subdivided data have been stored. In such a disk array arranged by a large number of drives, since the probability of the occurrences of faults is increased due to an increased number of components, such parity data is prepared to improve the reliability of the disk array.

Next, the disk array at the level 5 in which data is distributed and the distributed data are independently handled, will now be explained. In this disk array, a plurality of data is not subdivided but rather is separately handled, parity data is produced from a plurality of data, and then these data are distributively stored into drives each having a relatively small capacity. As previously explained, this parity data is used to recover data stored in a drive where a fault happens to occur during an occurrence of such a fault.

Recently, in the data storage device of the large-scale general purpose computer system, since one drive is used in response to other read/write commands, this drive cannot be used and therefore, many waiting conditions happen to occur. In accordance with this disk array, since the data are distributively stored into the plural drives, even when the number of read/write demands is increased, the data are distributively processed in the plural drives, so that such waiting conditions for the read/write demands are suppressed.

In the data storage devices of these disk arrays, the storage positions (addresses) for the respective data are fixed to predetermined addresses, and when either data read operation, or data write operation is performed from the CPU, this CPU accesses these fixed addresses.

An important element in a RAID 5 system is to ensure that the data is readable all of the time. The readability is important when one drive is down and data has to be read from all other drives to perform RAID data reconstruct. If there is any problem reading data from the others it can cause a failure when reconstructing data. In addition the greater the number of hard disk drives (HDDs), the greater the probability of hitting an unreadable portion.

Another problem is that periodically there are hardware or microcode problems in which data on one of the drives is corrupted but not detected even though the data and parity are inconsistent. Accordingly, it is important in this instance to determine which HDD contains the corrupted data.

Accordingly what is needed is a system and method for addressing the above mentioned problems in reconstructing corrupted data in a RAID system. The present invention addresses this need.

SUMMARY OF THE INVENTION

The present invention provides a method and system for detecting corrupted data on one of a plurality of hard disk drives (HDDs) in a data storage subsystem. In this system a predetermined number of fixed blocks within each of the HDDs emulate a track of a first track format. The predetermined number of fixed blocks provide a logical track. The logical track of one of the plurality of HDDs is generated by the others of the plurality of HDDs. The plurality of logical tracks form a plurality of track groups. In a first aspect the method and system comprise assigning each of the plurality of logical tracks an address translation (ADT) number; comparing each of the ADT numbers of the plurality of logical tracks to an expected value until a mismatch occurs in a logical track and determining if other logical tracks in a same track group have accurate ADT numbers. The first aspect further includes reconstructing the logical track if the other tracks within the same track group have accurate ADT numbers.

In a second aspect the method and system comprises determining if each of the plurality of logical tracks is formatted in accordance with first track format, comparing each of the formats of the plurality of logical tracks to the expected format until a mismatch occurs in a logical track, and determining if other logical tracks in a same track group have accurate first track formats. The second aspect includes reconstructing the logical track if the other tracks within the same track group have accurate first formats.

In a third aspect, the method and system further includes regenerating the one track from the other logical tracks of the track group, comparing the one track to the regenerated one track, and determining which of the plurality of HDDs includes corrupted information if mismatch occurs. The third aspect further includes reconstructing the information in the HDDs which includes corrupted data.

Accordingly, a system and method in accordance with the present invention provides the following advantages. If one of the HDDs has corrupted data, it can be reconstructed before the data storage subsystem needs to utilize the data (during a background scan). It also allows for the detection and reconstruction of corrupted data when the data storage subsystem encounters the corrupted data during system data access. Finally, the present invention minimizes the parity and data inconsistency that is caused by hardware and software problems in disk array systems such as RAID-5 system.

BRIEF DESCRIPTION OF THE DRAWINGS

FIG. 4 shows the home address and count format for the CKD format.

DESCRIPTION OF THE INVENTION

The present invention relates to detection and reconstruction of data in a disk array system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
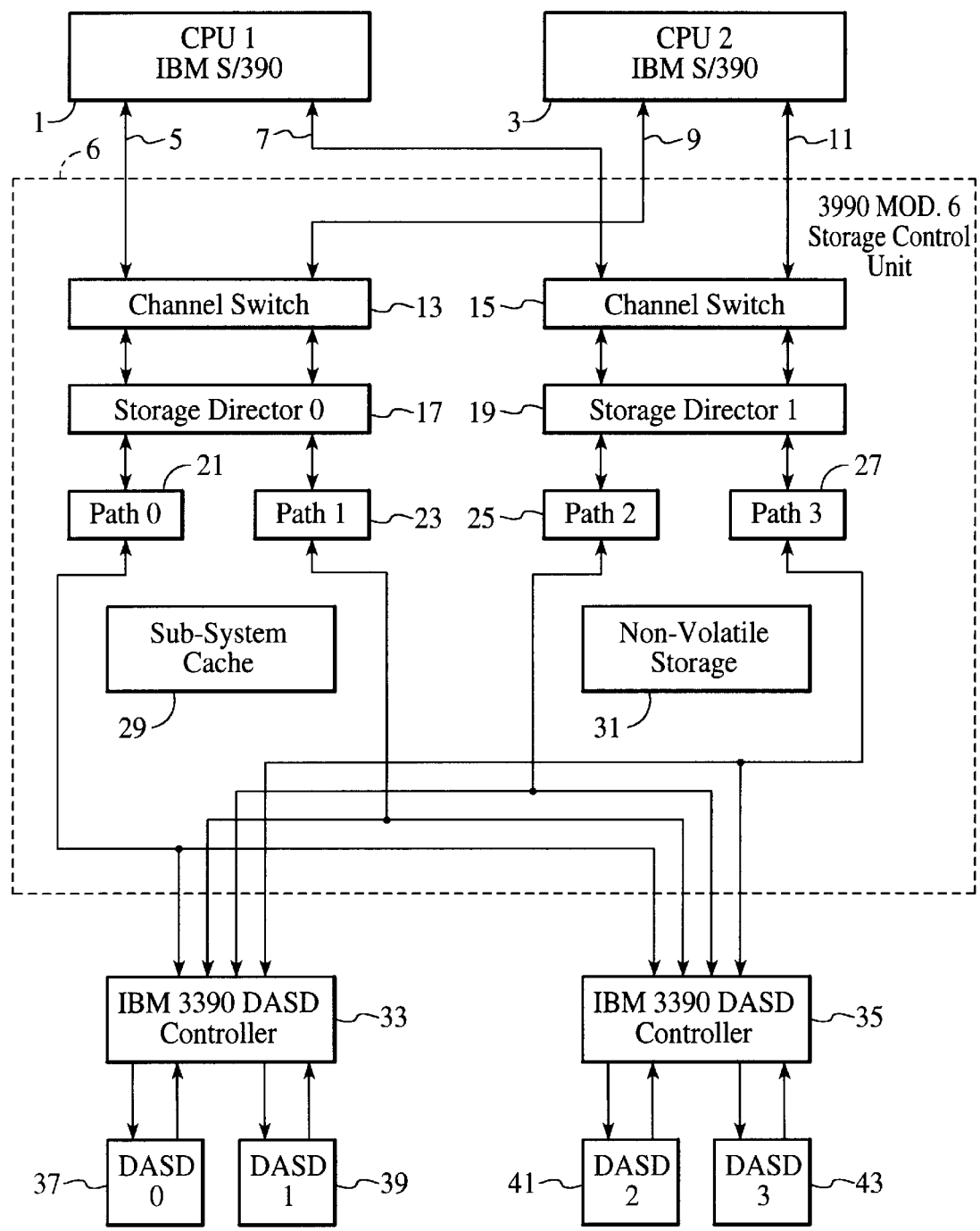
FIG. 1 shows a logical block diagram of an IBM 3990/3390 illustrative of a hierarchical demand/responsive storage subsystem.

Referring now to FIG. 1, there is shown a functional block diagram depiction of the IBM 3990/3390 Disk Storage Subsystem exemplifying a host-attached, hierarchical, demand/response storage subsystem. This subsystem is shown driven from first and second multiprogramming, multitasking hosts CPU1 and 3, such as an IBM System/390 running under the IBM MVS operating system. The subsystem is designed such that data stored on any of the DASD storage devices 37, 39, 41, and 43 can be accessed over any one of at least two failure-independent paths from either one of the CPUs 1 or 3. The system as shown provides four failure-independent paths. Illustratively, data on devices 37 or 39 can be reached via 330-controller 33 over any one of paths 21, 23, 25, or 27. The same holds for data stored on devices 41 or 43 via controller 35. A full description of this principle is to be found in the U.S. Pat. No. 4,207,609, herein incorporated by reference.

The 3990 storage control unit consists of at least two storage directors 17 and 19. These are microprocessors and attendant local memory and related circuitry (not shown) for interpreting control information and data from the CPUs, establishing logical and physical paths to the storage devices, and managing fault and data recovery at the subsystem level. The read and write transfer directions are separately tuned. That is, read referencing is first made to cache 29, and read misses cause data tracks to be staged from the devices as backing stores. Write referencing either as a format write or an update write is made in the form of track transfers from the host to a nonvolatile store 31. From NVS 31, it is destaged to the devices through their sundry controllers.

Typically, an application executing on a host 1 or 3 requests to read a file, write a file, or update a file. These files are ordinarily stored on a large bulk 3990/3390 DASD storage subsystem 6. The MVS host (S/390) is responsive to any read or write call from the application by invoking an access method. An access method, such as VSAM, is a portion of the OS for forming an encapsulated message containing any requested action. This message is sent to an input/output (I/O) portion of the host, and ultimately the storage subsystem. Typically, the message includes the storage action desired, the storage location, and the data object and descriptor, if any. This "message" is turned over to a virtual processor (denominated a logical channel). The function of the logical channel is to send the message to the storage subsystem over a physical path connection (channels 5, 7, 9, 11). The storage subsystem control logic (director 17 or 19) then interprets the commands. First, a path to the designated storage device is established and passes the interpreted/accessing commands and data object to the storage device location on a real time or deferred basis. The sequence of commands is denominated "channel command words" (CCWs). It should be appreciated that the storage device may be either "logical" or "real". If the device is "logical", then device logic at the interface will map the access commands and the data object into a form consistent with the arrangement of real devices. Thus, a RAID 5 array of small DASDs substitutes for one or more IBM 3390 large DASDs.

The "access method" portion of the MVS operating system, when processing data objects in the form of variable length ECKD records, also will ascertain either a "new address" or an old (update in place) address. The access method assumes that external storage includes actual physical DASDs, etc., devices. It generates addresses on a DASD device, cylinder, head, and record (CCHHRR) basis. Significantly, the data objects are ordinarily aggregated on a 3380/3390 DASD track basis. That is, when an application requests one or more records, the access method determines what would be an efficient unit of staging, i.e., record staging or track staging between the S/390 and the 3990 SCU. Accordingly, the access method modifies the CCW chain and address extent occasionally from a track to a record. In turn, the logical channel will cause a string of CCWs, together with "track-formatted" data, to be destaged to a 3990 storage control unit (SCU). An IBM 3990 storage control unit (SCU) "interprets" the CCWs and batches the writes in the nonvolatile store 31 (NV write buffer) for later destaging to one or more 3390 logical or physical DASDs 37, 39, 41, 43. If a track is written out to a real 3390 DASD, then it will perform ECC processing as discussed subsequently. Originally, an access method comprised a set of protocols for moving data between a host main memory and physical input/output devices. However, today it is merely a mapping to a logical view of storage, some of which may be physical storage.

Figure 2:
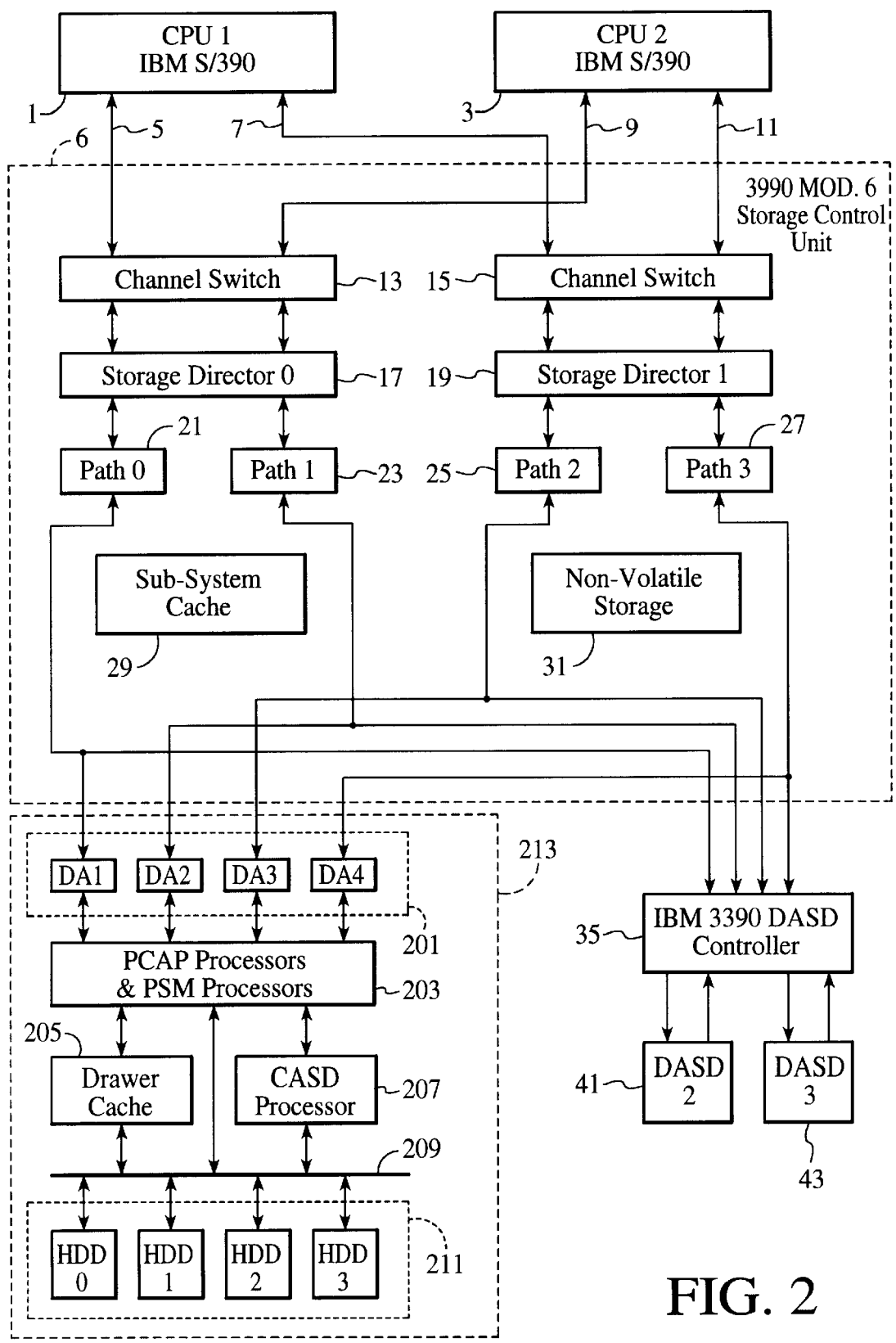
FIG. 2 depicts the subsystem of FIG. 1 but is modified to set out the attachment of a RAID 5-DASD array as a logical 3390 DASD in addition to the attachment of real 3390 DASDs.

Referring now to FIG. 2, there is depicted the subsystem of FIG. 1, but modified to set out the attachment of a RAID 5 DASD array 213 as a logical 3390 DASD, in addition to the attachment of real 3390 DASDs. In this regard, the IBM 3990 SCU Model 6 (FIG. 2/6) utilizes a large cache (up to 2 gigabytes) (FIG. 2/29). The data is always staged and destaged in the form of 3380/3390 tracks. This occurs when staging data between a plurality of logical (FIG. 2/213) or real 3390 DASDs (FIG. 2/35, 41, 43) and the 3990 cache (FIG. 2/29) and destaging data between an NV write buffer (FIG. 2/31) and the logical or real 3390 DASDs.

When track-formatted data is written out to the DASDs at the physical device, an ECC check byte is calculated over any CKD field within the CKD record and stored on the track. Upon any subsequent read access, an ECC calculation is performed and a comparison is made between the stored values and the calculated values. Any mismatch is indicative of data corruption. Restated, upon read back or staging of the data from a DASD, detection of any nonzero syndrome is an indication of random or burst error in the data.

Referring again to FIG. 2, there is depicted a RAID 5 array 213 of small DASDs 211 attached to the control logic 17, 19 of the IBM 3990 storage control unit 6 over the plurality of paths 21, 23, 25, and 27 via device adapters (DAs) 201. One implementation of RAID 5 arrays is to be found in the IBM RAMAC Array DASD attaching one or more Enterprise System (S/390) EKCD channels through an IBM 3990 Model 3 or 6 storage control unit. The RAMAC Array DASD comprises a rack with a capacity between 2 to 16 drawers. Each drawer 213 includes four disk drives HDD0–HDD3, cooling fans, control processor 207, ancillary processors 203, and a nonvolatile drawer cache 205. It is configured as a track staging/destaging to three DASDs' worth of data space and one DASD's worth of parity in a RAID 5 DASD array. Each drawer emulates between two to eight IBM 3390 Model 3 volumes.

Functionally, the DAs 201 provide electrical and signal coupling between the control logic 17 and 19 and one or more RAID 5 drawers. As tracks are staged and destaged through this interface, they are converted from variable length CKD format to fixed-block length FBA format by the ancillary processors 203. In this regard, drawer cache 205 is the primary assembly and disassembly point for the blocking and reblocking of data, the computation of a parity block, and the reconstruction of blocks from an unavailable array of DASDs. In this embodiment, the four DASDs are used for storing parity groups. If a dynamic (hot) sparing feature is used, then the spare must be defined or configured a' priori. Space among the four operational arrays is distributed such that there exists three DASDs' worth of data space and one DASD's worth of parity space. It should be point out that the HDDs 211, the cache 205, and the processors 203 and 207 communicate over an SCSI-managed bus 209. Thus, the accessing and movement of data across the bus between the HDDs 211 and the cache 205 is closer to an asynchronous message-type interface.

Figure 3:
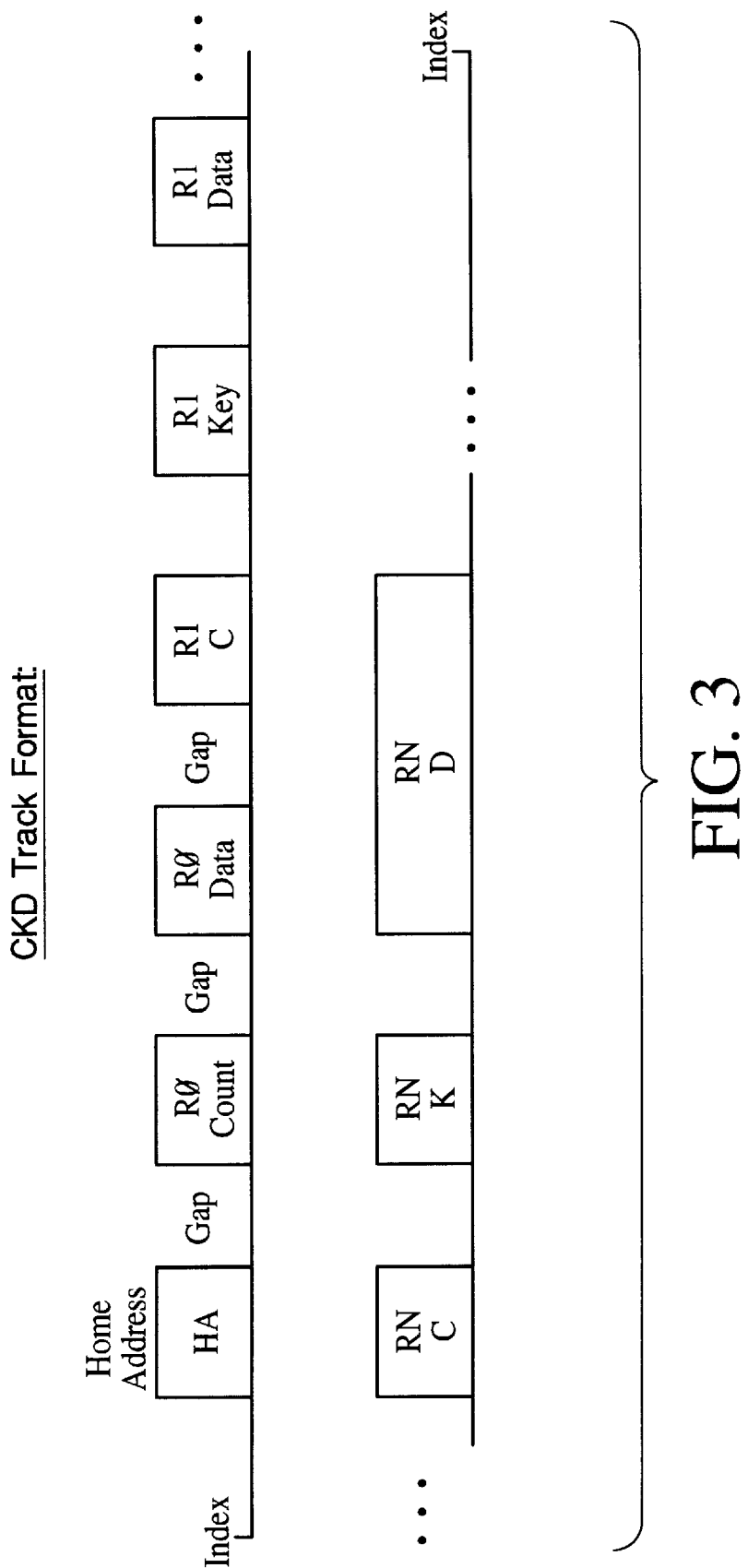
FIG. 3 shows a CKD track format.

The present invention is directed to accurately and quickly reconstructing data on a disk array system when the data on a particular disk drive becomes corrupted. To more fully explain the present invention, certain background information will first be discussed in the context of a particular format, that is the count, key, data (CKD) format. Referring now to FIG. 3, what is shown is the CKD track format. The CKD data track format is circular and is based upon the size of the disk. As is seen in FIG. 2, the CKD format includes a home address (HA), a plurality of counts (R0–RN count), a plurality of keys R1–RN keys and a plurality of data R0–RN data. The Index is the starting and end point of the track. As is seen in the CKD format, there are gaps between each of the fields. Accordingly, the lengths of the fields are known from the content of the count field.

Referring now to FIG. 4, a 3390 CKD track in a preferred embodiment is emulated by 89 SCSI fixed blocks. Each fixed block is preferably 688 bytes with the first 8 bytes, or the header, are reserved for drawer internal usage. The other 680 bytes are used to emulate 680 bytes of the 3390 track. The gap between records and fields are also emulated.

Figure 5:
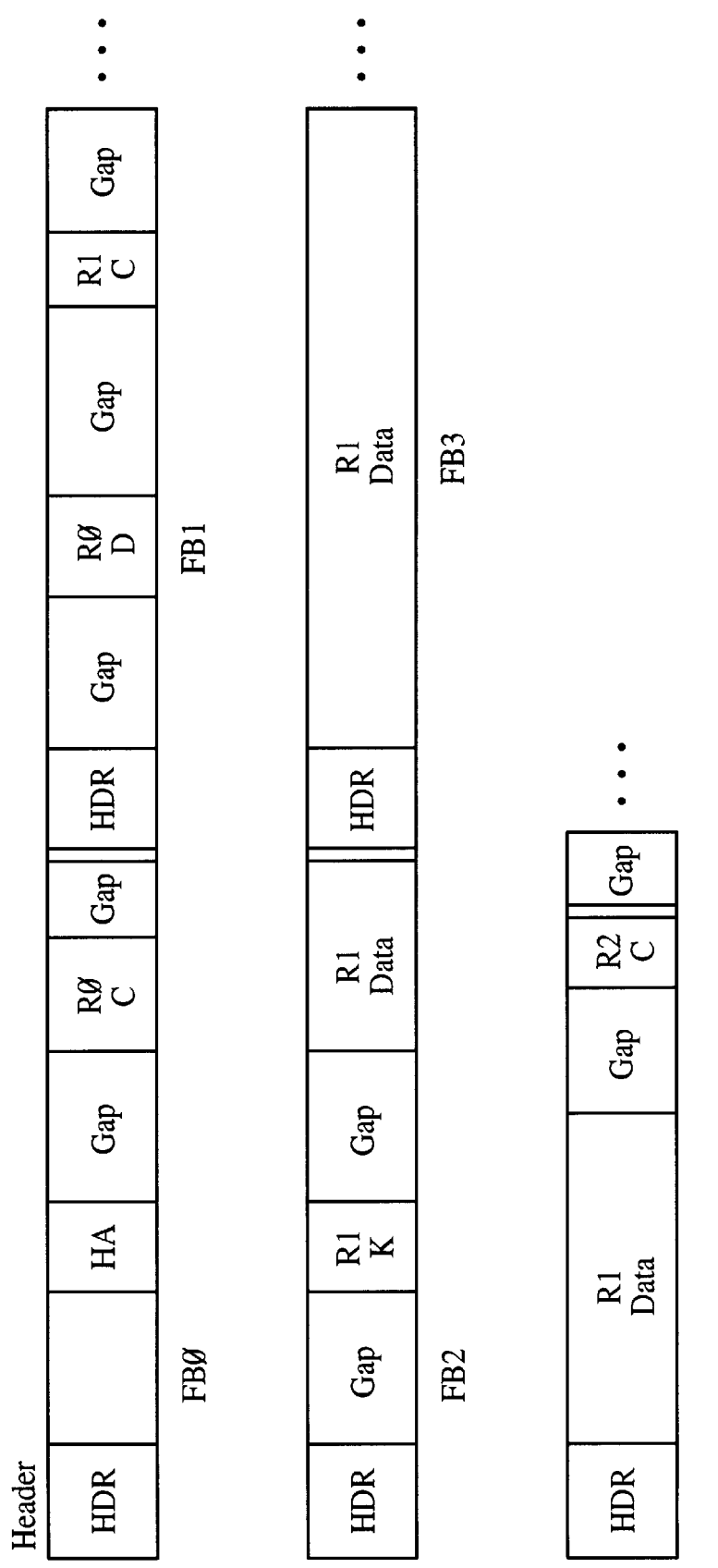
FIG. 5 shows the emulation of the CKD format with Fixed Blocks of HDD.

As is seen in FIG. 5, the 8 byte header field contains a 4 byte address data translation number ADT. Each CKD track including the corresponding parity is assigned a unique ADT number so all 89 fixed blocks belong to the same CKD or parity track have the same ADT number. In this embodiment, there are four hard disk drives, which are referred to as a three plus P RAID 5 product. In this type of product, three logical CKD tracks from three HDDs are used to generate the parity track on the fourth HDD. These three data tracks plus the corresponding parity track constitute a track group or slice.

It is known that if a Fixed HDD ECC detects a media problem during the background scan, the RAMAC drawer will then decide if the media problem is severe enough to cause a rewrite of the Fixed Block data and skip the bad Block by reassigning Fixed Blocks.

If the data deteriorates enough, unreadable data will be reconstructed with RAID redundancy before rewrite. If there is no RAID redundancy, the rewrite will use whatever data read from the failed media area. However, although this is effective for its intended purpose it does not address the issue of data and parity inconsistencies. The present invention provides a system and method for reconstructing data during either a background scan of data storage subsystem or when the storage subsystem reads or encounters corrupted data. What is meant by a background scan in the context of the present invention is monitoring the HDDs during the period that the storage subsystem is not attempting to read any data. The system and method efficiently reconstructs data utilizing a plurality of techniques. One technique is to monitor the address translation (ADT) numbers of the fixed blocks of the HDDs for an error. A second technique is to monitor the CKD track format for an error. Finally a third technique is to compare the parity block and a parity block generated from the data for that particular track group to determine if there is an error. This technique as will be described in detail later is a superset of the first two above described techniques.

Each of the above-identified techniques will accurately and quickly provide an indication of corrupted data of those HDDs being monitored if one of the HDDs has unreadable or unexpected information. To more particularly describe the present invention in more detail, refer to the following discussion in conjunction with the accompanying figures.

The present invention will be discussed in the context of a background scan of a track group. Although the following discussion is in the context of a background scan of the data storage subsystem, the present invention is also used during system data access for detecting and reconstructing corrupted data.

When a data storage subsystem performs a background scan, microcode in a RAMAC drawer 213 schedules a background scan of one track group at a time. Accordingly, each time the predetermined number of Fixed Blocks (in this case 89) are read from each of the HDDs, one or all of the following techniques can be performed during a data read.

ADT Number Comparison

Figure 6:
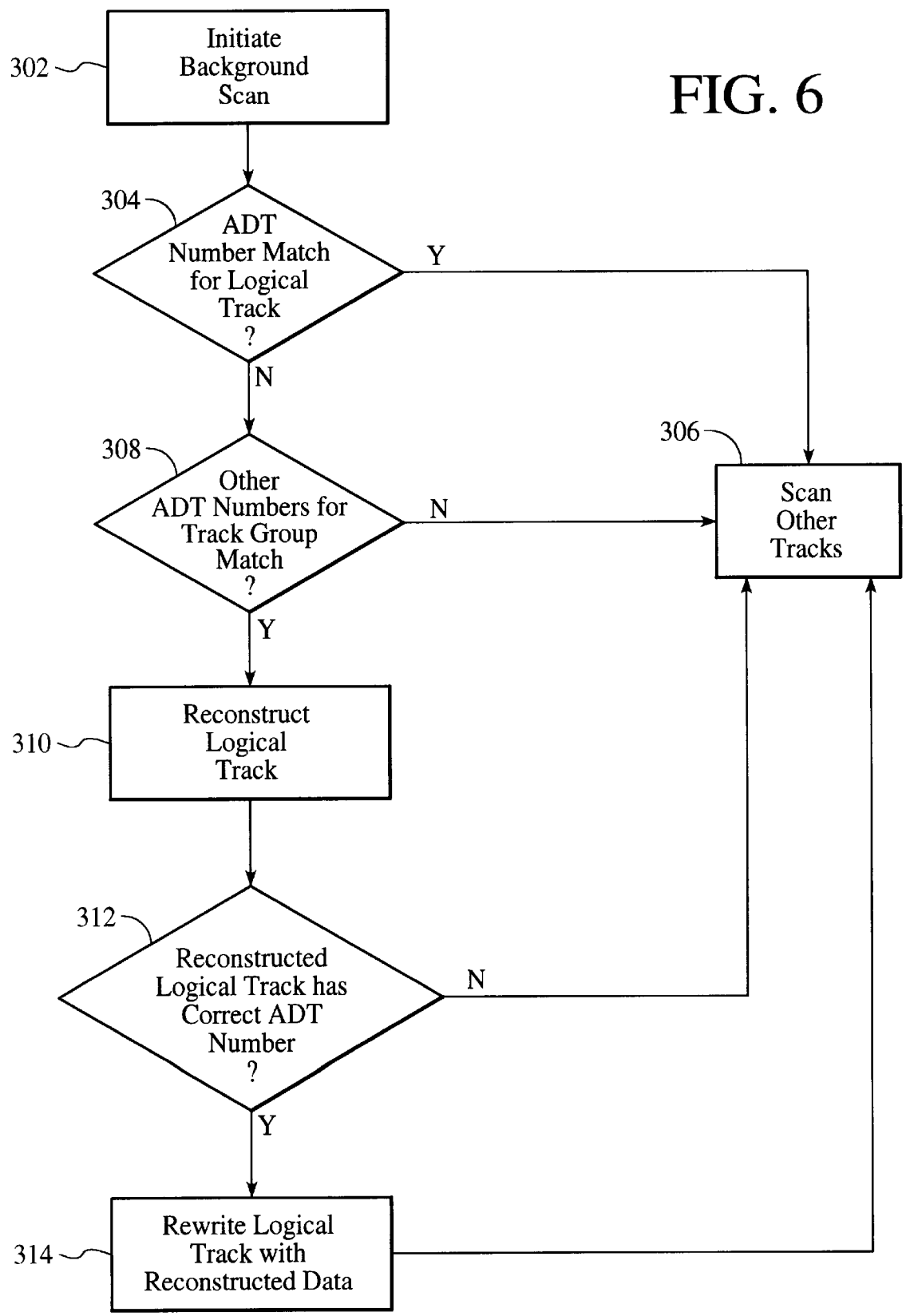
FIG. 6 is a flow chart showing the ADT comparison technique for reconstructing data.

FIG. 6 is a flow chart showing the ADT comparison technique for reconstructing data. In this embodiment, first the background scan is initiated, via step 302. Then it is determined if the ADT number matches an expected value for that logical track, via step 304. If there is a match, then other tracks can be scanned, via step 306. If there is a mismatch, it is determined if the other logical tracks within the track group have matching ADT numbers, via step 308. If the other ADT numbers do not match, then other logical tracks are scanned, via step 306. However, if the other ADT numbers do match, then the logical track with the mismatched logical tracks is reconstructed, via step 310. The reconstructed logical track is checked to determine if it now has the correct ADT number, via step 312. If it does not, then the other tracks are scanned, via step 306. If the logical track now has the correct ADT number, then the logical track is rewritten with the reconstructed data, via step 314.

CKD Format Comparison

The drawer can also include simple CKD intelligence therewithin. In a preferred embodiment, with this intelligence the data tracks within the track group can be checked to determine if the CKD records formatted correctly. The checking algorithm can determine, for example, if each record and field is located at the correct location on the track.

Figure 7:
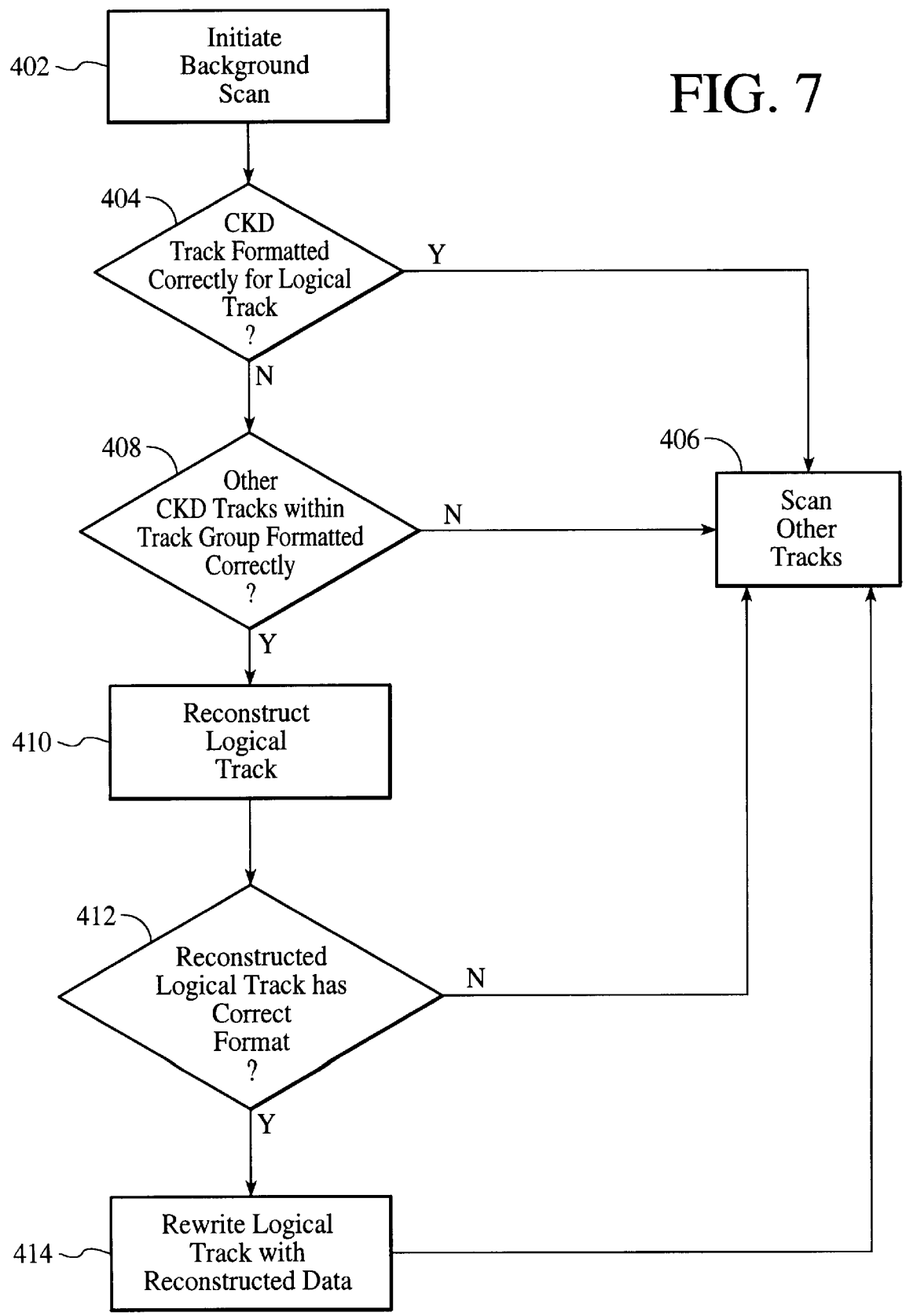
FIG. 7 is a flow chart showing the CDK format comparison technique for reconstructing data.

FIG. 7 is a flow chart showing the CDK format comparison technique for reconstructing data. In this embodiment, first the background scan is initiated, via step 402. Then it is determined if the CDK format matches an expected value for that logical track, via step 404. If there is a match, then other tracks can be scanned, via step 406. If the CKD format is invalid, it is determined if the CKD data for the other logical tracks for the track group have valid CKD formats, via step 408. If the other CKD formats are not valid, then other logical tracks are scanned, via step 406. However, if the CKD formats are valid, then the logical track with the invalid CKD format is reconstructed, via step 410. The reconstructed logical track is checked to determine if it now has the valid CKD format, via step 412. If it does not, then the other tracks are scanned, via step 406. If the logical track now has the valid CKD format, then the logical track is rewritten with the reconstructed data, via step 314.

Parity and Data Consistency

In this feature, the drawer will regenerate the parity track from the data tracks and compare the result with the Parity read from the HDD. If the compare fails, then this is an indication inconsistency between the Data and Parity of HDD.

Figure 8:
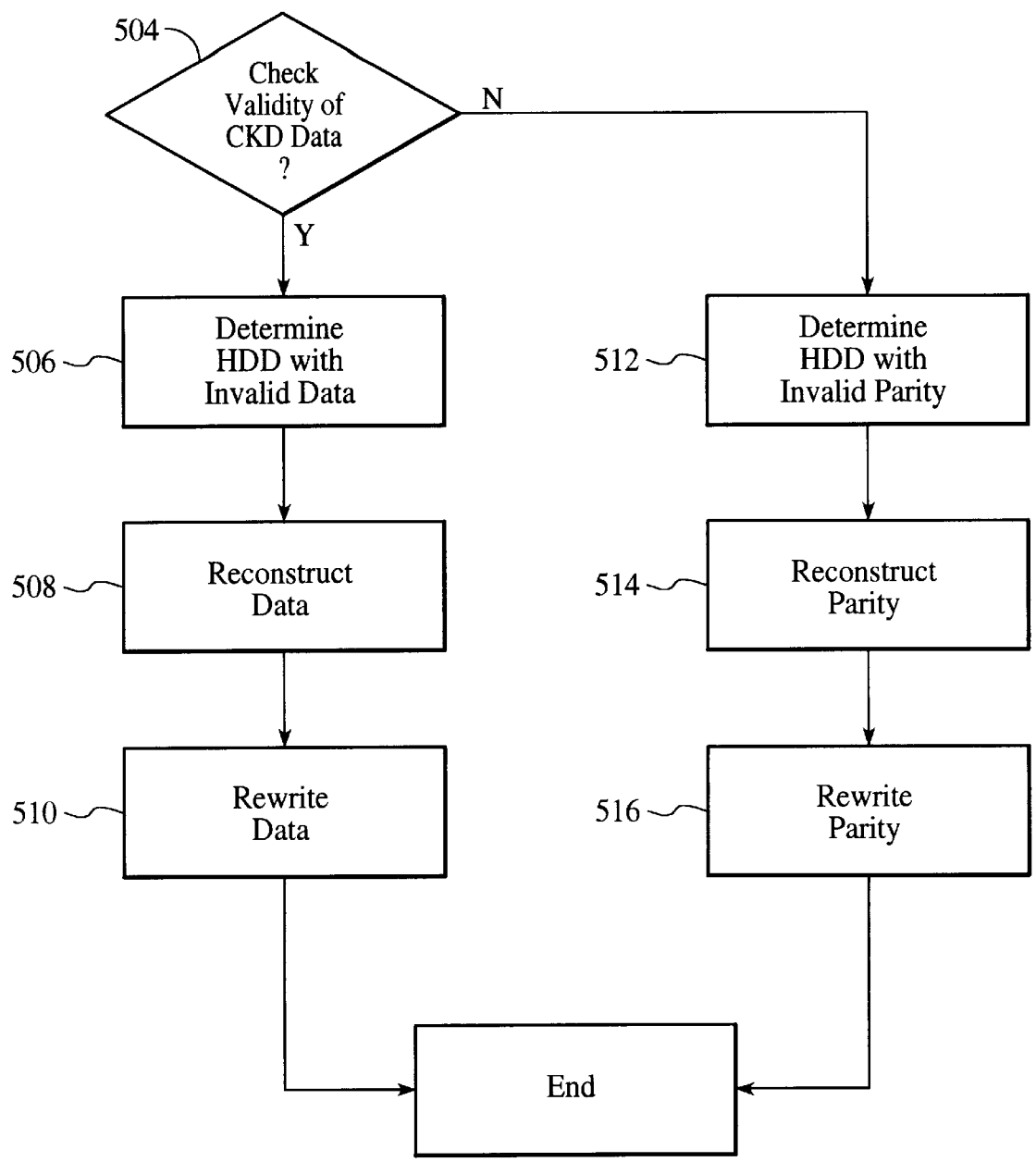
FIG. 8 is a flow chart showing the parity and data consistency techniques for reconstructing data.

FIG. 8 is a flow chart showing the parity and data consistency techniques for reconstructing data. To detect which HDD contains corrupted data, the following algorithm is used to transfer the suspected data tracks of the track group to the data storage subsystem (i.e., the 3990). The data storage subsystem will check the validity of the CKD data, via step 504. Typically the data storage subsystem will utilize the CKD ECC, the CKD record content, such as PA (physical Address) value of a record, and correctness of CKD format, such as correct record sizes to check the validity. The HDD with invalid data detected by the data processing system is determined to contain corrupted data, via step 506. This piece of data is reconstructed with RAID redundancy, via step 508, and then rewritten to the HDD, via step 510.

If there is no invalid data detected by the data processing system on the data tracks of the track group, the data processing system determines the Parity content on the Parity HDD has been corrupted, via step 512. The Parity is then reconstructed, via step 514 and rewritten back to HDD, via step 516.

Notice that this data and parity consistency method of corrupted data detection is a superset of the prior two methods, i.e., the ADT and CKD format checking methods. Any error that is detected and corrected by the prior two methods will also be detected and corrected by this method.

Accordingly, a system and method in accordance with the present invention provides the following advantages. If one of the HDD has corrupted data, it can be reconstructed before the processing needs to utilize the data (during a background scan). In addition, if the data storage subsystem encounters corrupted data, a system and method in accordance with the present invention allows for quickly reconstructing the data and parity information. Finally, the present invention minimizes the parity and data inconsistency that is caused by hardware and software problems in the disk array system such as RAID-5 systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting corrupted data in one of a plurality of hard disk drives (HDDS) in a data storage subsystem, a predetermined number of fixed blocks within each of the HDDs emulating a track of a first track format, the predetermined number of fixed blocks providing a logical track, the logical track of one of the plurality of HDDs being generated by the others of the plurality of HDDs, the plurality of logical tracks forming a plurality of track groups; the method comprising the steps of:

a) assigning each of the plurality of logical tracks an address translation (ADT) number;

b) comparing each of the ADT numbers of the plurality of logical tracks to an expected value until a mismatch occurs in a logical track;

c) determining if other logical tracks in a same track group have accurate ADT numbers; and d) reconstructing the logical track if the other tracks within the same track group have accurate ADT numbers.

2. The method of claim 1 in which the corrupted data is detected during a background scan.

3. The method of claim 1 in which the corrupted data is detected when the corrupted data is read by the data storage subsystem.

4. The method of claim 1 in which the first format comprises CKD format.

5. The method of claim 1 in which the processing system comprises a RAID-5 system.

6. The method of claim 1 which further includes the steps of:

(e) determining if the reconstructed logical track has an accurate ADT number; and (f) rewriting the reconstructed logical track on the HDD if the ADT number is accurate.

7. The method of claim 1 in which the one of the plurality of HDDs being a parity HDD.

8. The method of claim 1 in which the others of the plurality of HDDs being the data HDDs.

9. A method for detecting corrupted data in one of a plurality of hard disk drives (HDDs) in a data storage subsystem, a predetermined number of fixed blocks within each of the HDDs emulating a track of a first track format, the predetermined number of fixed blocks providing a logical track, the logical track of one of the plurality of HDDs being generated by the others of the plurality of HDDs, the plurality of logical tracks forming a plurality of track groups; the method comprising the steps of:

a) determining each of the plurality of logical tracks is formatted in accordance with an expected first track format;

b) comparing each of the formats of the plurality of logical tracks to the expected first track format until one of the logical tracks has an invalid format;

c) determining if other logical tracks in a same track group have valid first track formats; and d) reconstructing the logical track if the other tracks within the same track group have valid first track formats.

10. The method of claim 9 in which the corrupted data is detected during a background scan.

11. The method of claim 9 in which the corrupted data is detected when the corrupted data is read by the data storage subsystem.

12. The method of claim 9 in which the processing system comprises a RAID-5 system.

13. The method of claim 9 in which the first format comprises CKD format.

14. The method of claim 13 wherein validity is determined by utilizing the CKD ECC.

15. The method of claim 13 wherein validity is determined by utilizing the CKD record content such as the physical address value of a record.

16. The method of claim 13 wherein validity is determined by the correctness of the record format such as a correct record size.

17. The method of claim 13 which further includes the steps of:

(e) determining if the reconstructed logical track has a valid first format; and (f) rewriting the reconstructed logical track on the HDD if the first track format is valid.

18. The method of claim 17 in which the one of the plurality of HDDs being a parity HDD.

19. The method of claim 17 in which the others of the plurality of HDDs being the data HDDs.

20. The method of claim 17 in which the determining step (a) comprises the step of determining if each record and field is located at a correction location within a logical track.

21. A method for detecting corrupted data in one of a plurality of hard disk drives (HDDs) in a data storage subsystem, a predetermined number of fixed blocks within each of the HDDs emulating a track of a first track format, the predetermined number of fixed blocks providing a logical track, the logical track of one of the plurality of HDDs being generated by the others of the plurality of HDDs, the plurality of logical tracks forming a plurality of track groups; the method comprising the steps of:

a) regenerating the one track from the other logical track;

b) comparing the one track to the regenerated one track;

c) determining which of the plurality of HDDs includes corrupted information if mismatch occurs; and d) reconstructing the information in the HDD which includes corrupted data.

22. The method of claim 21 in which the corrupted data is detected during a background scan.

23. The method of claim 21 in which the corrupted data is detected when the corrupted data is read by the data storage subsystem.

24. The method of claim 21 in which the one of the plurality of HDDs being a parity HDD.

25. The method of claim 21 in which the others of the plurality of HDDs being the data HDDs.

26. A system for detecting corrupted data in one of a plurality of hard disk drives (HDDs) in a data storage subsystem, a predetermined number of fixed blocks within each of the HDDs emulating a track of a first track format, the predetermined number of fixed blocks providing a logical track, the logical track of one of the plurality of HDDs being generated by the others of the plurality of HDDs, the plurality of logical tracks forming a plurality of track groups; the system comprising:

means for assigning each of the plurality of logical tracks an address translation (ADT) number;

means for comparing each of the ADT numbers of the plurality of logical tracks to an expected value until a mismatch occurs in a logical track;

means for determining if other logical tracks in a same track group have accurate ADT numbers; and means for reconstructing the logical track if the other tracks within the same track group have accurate ADT numbers.

27. The system of claim 26 in which the corrupted data is detected during a background scan.

28. The system of claim 26 in which the corrupted data is detected when the corrupted data is read by the data storage subsystem.

29. The system of claim 26 which in which the first format comprises CKD format.

30. The system of claim 26 in which the processing system comprises a RAID-5 system.

31. The system of claim 26 which further includes:

means for determining if the reconstructed logical track has an accurate ADT number; and means for rewriting the reconstructed logical track on the HDD if the ADT number is accurate.

32. The system of claim 26 in which the one of the plurality of HDDs being a parity HDD.

33. The system of claim 26 in which the others of the plurality of HDDs being the data HDDs.

34. A system for detecting corrupted data in one of a plurality of hard disk drives (HDDs) in a data storage subsystem, a predetermined number of fixed blocks within each of the HDDs emulating a track of a first track format, the predetermined number of fixed blocks providing a logical track, the logical track of one of the plurality of HDDs being generated by the others of the plurality of HDDs, the plurality of logical tracks forming a plurality of track groups; the system comprising:

means for determining each of the plurality of logical tracks is formatted in accordance with an expected first track format;

means for comparing each of the formats of the plurality of logical tracks to the expected first track format until one of the logical tracks has an invalid format;

means for determining if other logical tracks in a same track group have valid first track formats; and means for reconstructing the logical track if the other tracks within the same track group have valid first track formats.

35. The system of claim 34 in which the corrupted data is detected during a background scan.

36. The system of claim 34 in which the corrupted data is detected when the corrupted data is read by the data storage subsystem.

37. The system of claim 34 in which the processing system comprises a RAID-5 system.

38. The system of claim 34 in which the first format comprises CKD format.

39. The system of claim 38 wherein validity is determined by utilizing the CKD ECC.

40. The system of claim 38 wherein validity is determined by utilizing the CKD record content such as the physical address value of a record.

41. The system of claim 38 wherein validity is determined by the correctness of the record format such as a correct record size.

42. The system of claim 34 which further includes:

means for determining if the reconstructed logical track has a valid first format; and means for rewriting the reconstructed logical track on the HDD if the first track format is valid.

43. The system of claim 42 in which the one of the plurality of HDDs being a parity HDD.

44. The system of claim 42 in which the others of the plurality of HDDs being the data HDDs.

45. The system of claim 42 in which the determining means comprises means for determining if each record and field is located at a correction location within a logical track.

46. A system for detecting corrupted data in one of a plurality of hard disk drives (HDDs) in a data storage subsystem, a predetermined number of fixed blocks within each of the HDDs emulating a track of a first track format, the predetermined number of fixed blocks providing a logical track, the logical track of one of the plurality of HDDs being generated by the others of the plurality of HDDs, the plurality of logical tracks forming a plurality of track groups; the system comprising the steps of:

means for regenerating the one track from the other logical track;

means for comparing the one track to the regenerated one track;

means for determining which of the plurality of HDDs includes corrupted information if mismatch occurs; and means for reconstructing the information in the HDD which includes corrupted data.

47. The system of claim 46 in which the corrupted data is detected during a background scan.

48. The system of claim 46 in which the corrupted data is detected when the corrupted data is read by the data storage subsystem.

49. The system of claim 46 in which the one of the plurality of HDDs being a parity HDD.

50. The system of claim 46 in which the others of the plurality of HDDs being the data HDDs.

* * * * *